(12) United States Patent
Migliaro, Jr.

(10) Patent No.: US 8,272,204 B2
(45) Date of Patent: Sep. 25, 2012

(54) CORE COWL AIRFOIL FOR A GAS TURBINE ENGINE

(75) Inventor: Edward F. Migliaro, Jr., Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 742 days.

(21) Appl. No.: 12/444,595

(22) PCT Filed: Oct. 12, 2006

(86) PCT No.: PCT/US2006/040247
§ 371 (c)(1),
(2), (4) Date: Apr. 7, 2009

(87) PCT Pub. No.: WO2008/045089
PCT Pub. Date: Apr. 17, 2008

(65) Prior Publication Data
US 2010/0077724 A1 Apr. 1, 2010

(51) Int. Cl.
*F02K 3/02* (2006.01)
(52) U.S. Cl. ............... 60/226.3; 60/226.1; 60/226.2
(58) Field of Classification Search ............ 60/226.1, 60/226.3, 232, 262, 771, 804, 226.2; 239/265.11, 239/265.19, 265.25
See application file for complete search history.

(56) References Cited

U.S. PATENT DOCUMENTS

| | | | |
|---|---|---|---|
| 3,422,624 A | | 1/1969 | Brooks et al. |
| 3,477,230 A | | 11/1969 | Bauger et al. |
| 3,598,318 A | * | 8/1971 | Schiel ............ 239/265.13 |
| 3,877,663 A | * | 4/1975 | Curran et al. ......... 244/110 B |
| 3,936,226 A | * | 2/1976 | Harner et al. ............ 416/28 |
| 4,651,521 A | * | 3/1987 | Ossi ................. 60/226.3 |
| 4,793,134 A | * | 12/1988 | Coplin et al. .......... 60/226.1 |
| 5,706,649 A | | 1/1998 | Robinson et al. |
| 5,782,431 A | | 7/1998 | Gal-Or et al. |

FOREIGN PATENT DOCUMENTS

| FR | 2650861 | 2/1991 |
|---|---|---|
| GB | 875496 | 8/1961 |

OTHER PUBLICATIONS

International Search Report and Written Opinion of the International Searching Authority for International application No. PCT/US2006/040247 mailed Nov. 21, 2007.
International Preliminary Report on Patentability for International application No. PCT/US20061040247 mailed Jan. 21, 2009.

* cited by examiner

*Primary Examiner* — William H Rodriguez
*Assistant Examiner* — Carlos A Rivera
(74) *Attorney, Agent, or Firm* — Carlson, Gaskey & Olds PC

(57) ABSTRACT

An example core nacelle for a gas turbine engine includes a core cowl positioned adjacent an inner duct boundary of a fan bypass passage and having a pocket and an airfoil received within the pocket. The airfoil is moveable between a first position and a second position to adjust a discharge airflow cross-sectional area of the gas turbine engine.

16 Claims, 2 Drawing Sheets

US 8,272,204 B2

CORE COWL AIRFOIL FOR A GAS TURBINE ENGINE

BACKGROUND OF THE INVENTION

This invention generally relates to a gas turbine engine, and more particularly to a turbofan gas turbine engine having a core cowl including an airfoil for increasing a discharge airflow cross-sectional area of the gas turbine engine.

In an aircraft gas turbine engine, such as a turbofan engine, air is pressurized in a compressor and mixed with fuel and burned in a combustor for generating hot combustion gases. The hot combustion gases flow downstream through turbine stages that extract energy from the gases. A high pressure turbine powers the compressor, while a low pressure turbine powers a fan disposed upstream of the compressor.

Combustion gases are discharged from the turbofan engine through a core exhaust nozzle, and fan air is discharged through an annular fan exhaust nozzle defined at least partially by a fan nacelle surrounding the core engine. A significant amount of propulsion thrust is provided by the pressurized fan air which is discharged through the fan exhaust nozzle. The combustion gases are discharged through the core exhaust nozzle to provide additional thrust.

A significant amount of the air pressurized by the fan bypasses the engine for generating propulsion thrust in turbofan engines. High bypass turbofans typically require large diameter fans to achieve adequate turbofan engine efficiency. Therefore, the nacelle of the turbofan engine must be large enough to support the large diameter fan of the turbofan engine. Disadvantageously, the relatively large size of the nacelle results in increased weight, noise and drag that may offset the propulsive efficiency achieved by the high bypass turbofan engine.

It is known in the field of aircraft gas turbine engines that the performance of the turbofan engine varies during diverse flight conditions experienced by the aircraft. Typical turbofan engines are designed to achieve maximum performance during normal cruise operation of the aircraft. Therefore, when combined with the necessity of a relatively large nacelle size, increased noise and decreased efficiency may be experienced by the aircraft at non-cruise operability conditions such as take-off, landing, cruise maneuver and the like.

Accordingly, it is desirable to provide a turbofan engine having a variable discharge airflow cross-sectional area that achieves noise reductions and improved fuel economy in a relatively inexpensive and non-complex manner.

SUMMARY OF THE INVENTION

An example core nacelle for a gas turbine engine includes a core cowl positioned adjacent an inner duct boundary of a fan bypass passage and having a pocket and an airfoil received within the pocket. The airfoil is moveable between a first position and a second position to adjust a discharge airflow cross-sectional area of the gas turbine engine.

An example nacelle assembly for a gas turbine engine includes a fan nacelle, a core nacelle within the fan nacelle that includes a core cowl having an airfoil, a sensor that detects an operability condition, and a controller in communication with the sensor to move the airfoil between a first position and a second position. The airfoil is received within a pocket of the core cowl and is positioned adjacent to a fan exhaust nozzle in the first position. The airfoil is moved to the second position to achieve a discharge airflow cross-sectional area greater than the discharge airflow cross-sectional area of the first position in response to detecting the operability condition.

An example method of increasing the discharge airflow cross-sectional area of a gas turbine engine includes sensing an operability condition and translating a core cowl airfoil in an aft direction of the gas turbine engine in response to detecting the operability condition. In one example, the operability condition includes a take-off condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
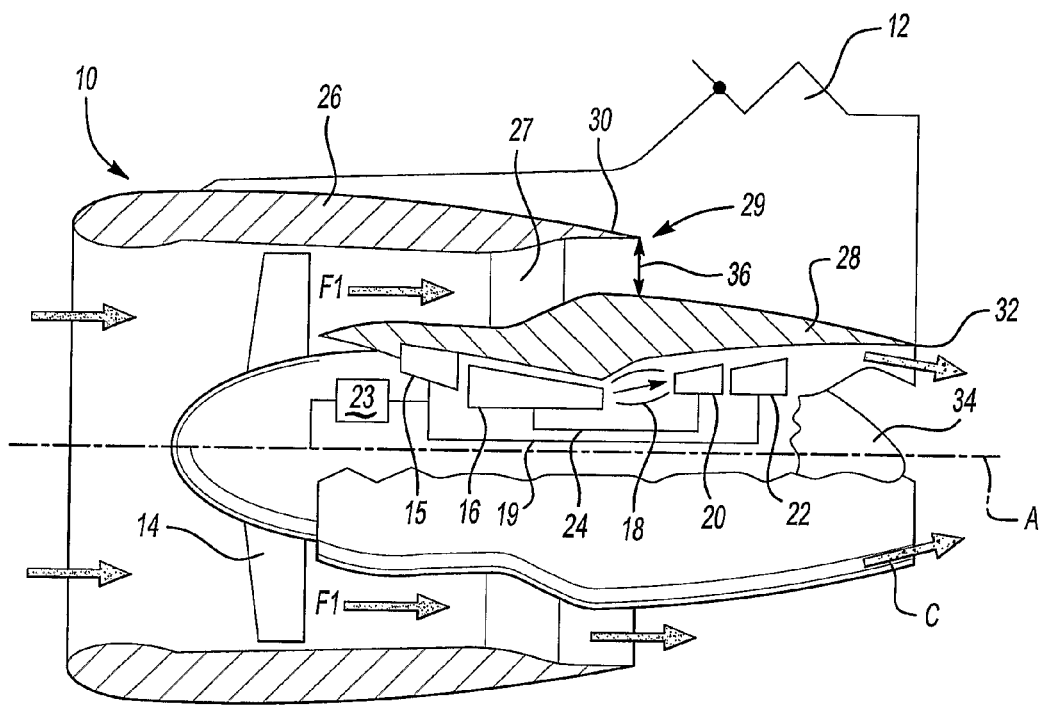
FIG. 1 illustrates a general perspective view of an example gas turbine engine.

Referring to FIG. 1, a gas turbine engine 10 suspends from an engine pylon 12 as is typical of an aircraft designed for subsonic operation. In one example, the gas turbine engine is a geared turbofan aircraft engine. The gas turbine engine 10 includes a fan section 14, a low pressure compressor 15, a high pressure compressor 16, a combustor 18, a high pressure turbine 20 and a low pressure turbine 22. A low speed shaft 19 rotationally supports the low pressure compressor 15 and the low pressure turbine 22 and drives the fan section 14 through a gear train 23. A high speed shaft 24 rotationally supports the high pressure compressor 16 and a high pressure turbine 20. The low speed shaft 19 and the high speed shaft 24 rotate about a longitudinal centerline axis A of the gas turbine engine 10.

During operation, air is pressurized in the compressors 15, 16 and mixed with fuel and burned in the combustor 18 for generating hot combustion gases. The hot combustion gases flow through the high and low pressure turbines 20, 22 which extract energy from the hot combustion gases.

The example gas turbine engine 10 is in the form of a high bypass ratio (i.e., low fan pressure ratio geared) turbofan engine mounted within a fan nacelle 26, in which most of the air pressurized by the fan section 14 bypasses the core engine itself for the generation of propulsion thrust. The example illustrated in FIG. 1 depicts a high bypass flow arrangement in which approximately 80 percent of the airflow entering the fan nacelle 26 may bypass the core nacelle 28 via a fan bypass passage 27. The high bypass flow arrangement provides a significant amount of thrust for powering the aircraft.

In one example, the bypass ratio is greater than 10, and the fan section 14 diameter is substantially larger than the diameter of the low pressure compressor 15. The low pressure turbine 22 has a pressure ratio that is greater than 5, in one example. The gear train 23 can be any known gear system, such as a planetary gear system with orbiting planet gears, planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to other engine architectures.

Fan discharge airflow F1 is discharged from the engine 10 through a fan exhaust nozzle 30, defined radially between a core nacelle 28 and the fan nacelle 26. Core exhaust gases C are discharged from the core nacelle 28 through a core exhaust nozzle 32 defined between the core nacelle 28 and a tail cone 34 disposed coaxially therein around the longitudinal centerline axis A of the gas turbine engine 10.

The fan exhaust nozzle 30 concentrically surrounds the core nacelle 28 near an aft most segment 29 of the fan nacelle 26. The fan exhaust nozzle 30 defines a discharge airflow cross-sectional area 36 associated with the fan bypass passage 27 between the fan nacelle 26 and the core nacelle 28 for axially discharging the fan discharge airflow F1 pressurized by the upstream fan section 14.

Figure 2:
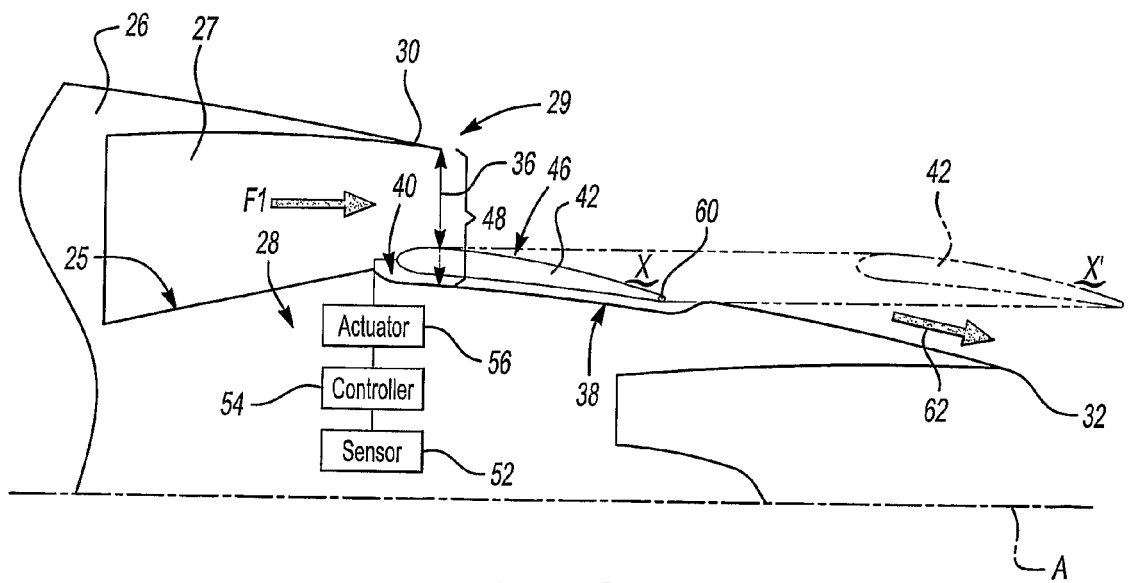
FIG. 2 is a schematic view of an example gas turbine engine having a core cowl including an airfoil moveable between a first position and a second position.

FIG. 2 illustrates an example core cowl 38 of the core nacelle 28 of the gas turbine engine 10. The core cowl 38 is an exterior flow surface of a section of the core nacelle 28. The core cowl 38 is positioned adjacent an inner duct boundary 25 of the fan bypass passage 27. The example core cowl 38 includes a pocket 40 for receiving an airfoil 42 near a top side of the core nacelle 28. Although the pocket 40 and the airfoil 42 are illustrated at the top side of the core nacelle, it should be understood that additional locations of the core nacelle could have a similar configuration. In one example, the airfoil 42 is at least partially received within the pocket 40 adjacent to the fan exhaust nozzle 30. The actual size and shape of the airfoil 42 and the pocket 40 of the core cowl 38 will vary depending upon design specific parameters including, but not limited to, the size of the core nacelle 28 and the efficiency requirements of the gas turbine engine 10.

In the illustrated example, the discharge airflow cross-sectional area 36 extends within the fan bypass passage 27 between the aftmost segment 29 of the fan nacelle 26 adjacent the fan exhaust nozzle 30 and an upper surface 46 of the airfoil 42. Varying the discharge airflow cross-sectional area 36 of the gas turbine engine 10 during specific flight conditions provides noise reductions and improved fuel consumption of the gas turbine engine 10. In one example, the discharge airflow cross-sectional area 36 is varied by translating the airfoil 42 aft from its stored position within the pocket 40. The airfoil 42 is moved from a first position X (i.e., the stored position within the pocket 40, represented by solid lines) to a second position X' (represented by phantom lines) in response to detecting an operability condition of the gas turbine engine 10. A discharge airflow cross-sectional area 48 of the second position X' is greater than the discharge airflow cross-sectional area 36 of the first position X. In one example, the operability condition includes a take-off condition. However, the airfoil 42 may be translated between the first position X and the second position X' in response to any known operability condition, such as landing or cruise.

A sensor 52 detects the operability condition and communicates with a controller 54 to translate the airfoil 42 between the first position X and the second position X' via an actuator assembly 56. Of course, this view is highly schematic. It should be understood that the sensor 52 and the controller 54 are programmable to detect known flight conditions. A person of ordinary skill in the art having the benefit of the teachings herein would be able to program the controller 54 to communicate with the actuator assembly 56 to translate the airfoil 42 between the first position X and the second position X'. The distance the airfoil 42 translates in response to detecting the operability condition will vary depending on design specific parameters. The actuator assembly 56 moves the airfoil 42 from the second position X' to the first position X within the pocket 40 during normal cruise operation (e.g., a generally constant speed at generally constant, elevated altitude) of the aircraft.

A secondary airflow passage 62 in addition to the fan bypass passage 27 extends between the airfoil 42 and the core exhaust nozzle 32 when the airfoil 42 is positioned at the second position X'. The secondary airflow passage 62 provides an additional passage for fan airflow F1 that in turn provides acoustic benefits. The secondary airflow passage 62 provides acoustic changes of the fan airflow F1 through the fan bypass passage 27.

The second discharge airflow cross-sectional area 48 permits an increased amount of fan airflow F1 to exit the fan exhaust nozzle 30 as compared to the first discharge airflow cross-sectional area 36. Therefore, the fan section 14 design is optimized for diverse operability conditions to achieve noise reductions and maximize fuel economy.

Figure 3:
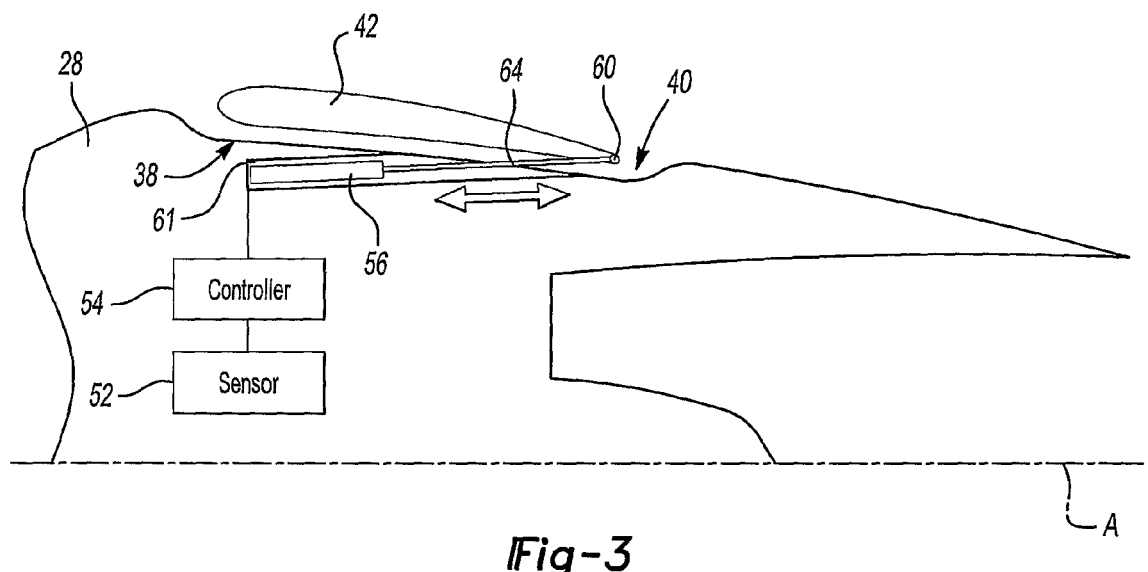
FIG. 3 illustrates an example actuator assembly for moving the airfoil between the first position and the second position.

FIG. 3 illustrates an example actuator assembly 56 mounted within a cavity 61 of the core nacelle 28, for example. In another example, the actuator assembly 56 is mounted to the core cowl 38. The actuator assembly 56 extends the airfoil 42 between the first position X and the second position X' in response to detecting the operability condition. In one example, the actuator assembly 56 comprises a hydraulically extendable rod 64. In another example, the actuator assembly 56 comprises an electrically extendable rod. In yet another example, the actuator assembly 56 is a ball screw. A worker of ordinary skill in the art with the benefit of the teachings herein would understand how to extend the airfoil 42 between the first position X and the second position X'. One example pocket 40 of the core cowl 38 is designed slightly larger than the airfoil 42 to provide clearance for the translation of the airfoil 42 between the first position X and the second position X'.

Figure 4:
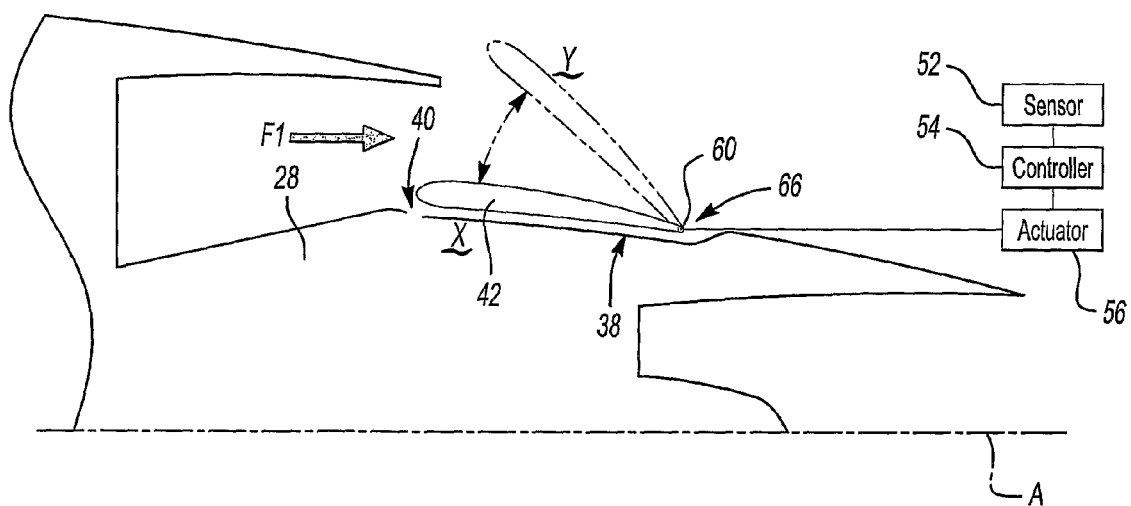
FIG. 4 is a schematic view of an example gas turbine engine having a core cowl including an airfoil moveable between a first position and a third position that is different than the second position illustrated in FIG. 2.

FIG. 4 illustrates another example arrangement of the airfoil 42. The airfoil 42 is pivotally mounted within the pocket 40 of the core cowl 38 with a pivot mount 60, for example. In one example, the pivot mount is a hinge pin. Other types of mounts may also be used to attach the airfoil 42 to the core cowl 38. The pivot mount 60 is located near a trailing edge 66 of the airfoil 42, in one example. However, the pivot mount 60 may be located anywhere on the airfoil 42. A worker of ordinary skill in the art with the benefit of the teachings herein would be able to pivotally mount the airfoil 42 within the pocket 40.

The airfoil 42 is pivotable between the first position X within the pocket 40 and another position Y (represented by phantom lines) by rotating the airfoil 42 about the pivot mount 60. In one example, the position Y is different than the second position X'. The pocket 40 is designed and sized to provide clearance for the rotational movement of the airfoil 42 between the first position X and the position Y. A worker of ordinary skill in the art with the benefit of this disclosure would understand how to design the pocket 40 to allow rotational movement of the airfoil 42.

Positioning the airfoil 42 at the position Y provides the gas turbine engine 10 with a thrust spoiling feature. In the position Y, the airfoil 42 temporarily diverts the fan airflow F1 such that the fan airflow F1 is blown in a forward direction to provide a thrust reversing force that acts against the forward travel of the aircraft, providing deceleration.

In one example, the airfoil 42 is pivoted to the position Y in response to an approach condition. An aircraft experiences approach conditions where descending toward a landing strip to land the aircraft. However, other operability conditions may be suitable for pivoting the airfoil 42 to position Y, or to any other positions.

The sensor 52 detects the approach condition and communicates with the controller 54 to pivot the airfoil 42 about the pivot mount 60 via the actuator 56. In one example, the sensor 52 detects the approach condition in response to the opening of the aircraft landing gear. In another example, the approach condition is detected in response to sensing a predefined aircraft altitude. In yet another example, the approach condition is detected in response to sensing a predefined aircraft airspeed.

In position Y, the fan discharge airflow F1 is forced in a forward direction rather than an aft direction of the gas turbine engine 10. Therefore, the airfoil 42 provides a thrust spoiling feature in a relatively inexpensive and non-complex manner as compared to prior-art thrust reversers. The airfoil 42 is returned from position Y to the first position X within the pocket 40 where thrust spoiling is no longer required by the aircraft.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A core nacelle for a gas turbine engine, comprising a core cowl positioned adjacent an inner duct boundary of a fan bypass passage, wherein said core cowl includes at least one pocket and at least one airfoil at least partially received within said at least one pocket, said at least one airfoil selectively movable between a first position within said at least one pocket and a second position that is downstream from said first position to adjust a discharge airflow cross-sectional area associated with said fan bypass passage, wherein said fan bypass passage extends between said core nacelle and a fan nacelle and a secondary airflow passage extends between said at least one airfoil and a core exhaust nozzle where said at least one airfoil is positioned at said second position.

2. The core nacelle as recited in claim 1, wherein the first position corresponds to a first discharge airflow cross-sectional area and the second position corresponds to a second discharge airflow cross-sectional area greater than said first discharge airflow cross-sectional area, wherein said at least one airfoil is selectively moved to said second position in response to at least one operability condition.

3. The core nacelle as recited in claim 2, wherein said at least one operability condition includes a take-off condition.

4. The core nacelle as recited in claim 1, comprising an actuator assembly operable to selectively translate said at least one airfoil between said first position and said second position.

5. The core nacelle as recited in claim 1, wherein said at least one airfoil is pivotally attached to said core nacelle within said at least one pocket and is positioned adjacent to a fan exhaust nozzle.

6. The core nacelle as recited in claim 5, comprising a pivot mount at a trailing edge of said at least one airfoil to pivotally attach said at least one airfoil to said core nacelle.

7. The core nacelle as recited in claim 1, wherein said second position is aft of a fan exhaust nozzle associated with said fan bypass passage.

8. A gas turbine engine system, comprising:
a fan nacelle defined about an axis and having a fan exhaust nozzle adjacent an aftmost segment of said fan nacelle;
a core nacelle at least partially within said fan nacelle, said core nacelle having a core cowl positioned adjacent said fan exhaust nozzle, wherein said core cowl includes at least one pocket and at least one airfoil, said at least one airfoil at least partially received within said at least one pocket and moveable between a first position having a first discharge airflow cross-sectional area and a second position having a second discharge airflow cross-sectional area greater than said first discharge airflow cross-sectional area, wherein a fan bypass passage extends between said fan nacelle and said core nacelle and a secondary airflow passage extends between said at least one airfoil and a core exhaust nozzle when said at least one airfoil is positioned at said second position;
a fan section positioned within said fan nacelle;
a gear train that drives at least said fan section; at least one compressor and at least one turbine positioned downstream of said fan section;
at least one combustor positioned between said at least one compressor and said at least one turbine;
at least one sensor that produces a signal representing an operability condition; and
a controller that receives said signal, wherein said controller moves said at least one airfoil from said first position to said second position in response to said operability condition.

9. The system as recited in claim 8, comprising an actuator assembly in communication with said controller and positioned within a cavity of said core nacelle, wherein said actuator assembly is extendable to selectively move said at least one airfoil between said first position and said second position in response to detecting said operability condition.

10. The system as recited in claim 8, wherein said operability condition includes a take-off condition.

11. The system as recited in claim 8, wherein said second position is aft of said first position.

12. The system as recited in claim 8, comprising a pivot mount that pivotally mounts said at least one airfoil to said core nacelle, wherein said at least one airfoil is pivoted from said first position to a second position in response to detection of an approach condition, wherein said pivot mount is positioned near a trailing edge of said at least one airfoil.

13. A method of increasing a discharge fan airflow cross-sectional area of a gas turbine engine, comprising the steps of:
  (a) sensing an operability condition; and
  (b) translating a core cowl airfoil at least partially received within at least one pocket in an aft direction of the gas turbine engine to adjust the discharge fan airflow cross-sectional area in response to sensing the operability condition;
  moving the core cowl airfoil from a first position to a second position, wherein the first position corresponds to a first discharge airflow cross-sectional area and the second position corresponds to a second discharge airflow cross-sectional area greater than the first discharge airflow cross-sectional area;
  providing a secondary airflow passage that extends between the core cowl airfoil and a core exhaust nozzle in response to moving the said core cowl airfoil to the second position.

14. The method as recited in claim 13, wherein the operability condition includes a take-off condition.

15. The method as recited in claim 13, comprising the step of:
  (c) returning the core cowl airfoil to the first position in response to detection of a cruise operation.

16. The method as recited in claim 15, comprising the step of:
  (d) pivoting the core cowl airfoil from the first position to a position different than the second position to spoil the thrust of the gas turbine engine in response to detection of an approach condition.

\* \* \* \* \*